US012789706B2

(12) United States Patent
Murthy et al.

(10) Patent No.: US 12,789,706 B2
(45) Date of Patent: Nov. 10, 2026

(54) SYSTEMS AND METHODS FOR DISPLAYING CMS IMAGES ON INSTRUMENT CLUSTER ELECTRONIC DISPLAY

(71) Applicant: Stoneridge Electronics AB, Solna (SE)

(72) Inventors: Banuprakash Murthy, Novi, MI (US); Fathima Irfhana, Lake Orion, MI (US)

(73) Assignee: Stoneridge Electronics AB, Solna (SE)

( * ) Notice: Subject to any disclaimer, the term of this patent is extended or adjusted under 35 U.S.C. 154(b) by 0 days.

(21) Appl. No.: 18/975,242

(22) Filed: Dec. 10, 2024

(65) Prior Publication Data

US 2026/0158998 A1 Jun. 11, 2026

(51) Int. Cl.
*B60R 1/27* (2022.01)

(52) U.S. Cl.
CPC .......... *B60R 1/27* (2022.01); *B60R 2300/105* (2013.01); *B60R 2300/301* (2013.01); *B60R 2300/303* (2013.01); *B60R 2300/70* (2013.01); *B60R 2300/804* (2013.01); *B60R 2300/8066* (2013.01)

(58) Field of Classification Search
CPC ................ B60R 1/27; B60R 2300/105; B60R 2300/301; B60R 2300/303; B60R 2300/70; B60R 2300/804; B60R 2300/8066; B60R 1/23; B60R 1/26; B60R 1/28; B60R 1/00
See application file for complete search history.

(56) References Cited

U.S. PATENT DOCUMENTS

| | | | | |
|---|---|---|---|---|
| 2021/0394686 | A1* | 12/2021 | Germaine | B60R 1/00 |
| 2022/0144089 | A1* | 5/2022 | Heinemann | B60K 35/26 |
| 2022/0242316 | A1* | 8/2022 | Hamano | H04N 7/183 |
| 2022/0314880 | A1* | 10/2022 | Petrillo | B60K 35/22 |
| 2023/0415651 | A1 | 12/2023 | Couperthwaite | |

FOREIGN PATENT DOCUMENTS

| | | |
|---|---|---|
| WO | 2022192663 | 9/2022 |
| WO | 2025038379 | 2/2025 |

OTHER PUBLICATIONS

International Search Report and Written Opinion for International Patent Application No. PCT/EP2024/085460 dated Jun. 25, 2025.

* cited by examiner

*Primary Examiner* — Michael E Teitelbaum
(74) *Attorney, Agent, or Firm* — Carlson, Gaskey & Olds, P.C.

(57) ABSTRACT

A method for a camera monitor system (CMS) includes utilizing at least one camera to obtain images of an external environment of a commercial vehicle and, based on detection of a trigger event, commencing display of one or more images from the at least one camera on a portion of an instrument cluster electronic display. A method for a camera monitor system (CMS) and a camera monitor system (CMS) are also disclosed.

16 Claims, 7 Drawing Sheets

SYSTEMS AND METHODS FOR DISPLAYING CMS IMAGES ON INSTRUMENT CLUSTER ELECTRONIC DISPLAY

TECHNICAL FIELD

This disclosure relates to systems and methods for displaying CMS images on an instrument cluster electronic display.

BACKGROUND

Vehicle camera systems for mirror replacement or for supplementing mirror views are utilized in commercial vehicles to enhance the ability of a vehicle operator to see a surrounding environment of the commercial vehicle. These systems are known as "camera monitor systems" (CMS), and they utilize one or more cameras mounted to a tractor of a commercial vehicle to provide an enhanced field of view to a vehicle operator of an area surrounding a trailer of the commercial vehicle. CMS may also include cameras in locations not typically associated with a mirror, such as a rear camera (e.g., a trailer camera) that records images of an area behind a vehicle, a camera that records an area in front of a vehicle, etc.

SUMMARY

A method for a camera monitor system (CMS) according to an example embodiment of the present disclosure includes utilizing at least one camera to obtain images of an external environment of a commercial vehicle and, based on detection of a trigger event, commencing display of one or more images from the at least one camera on a portion of an instrument cluster electronic display.

In a further embodiment of the foregoing embodiment, the commencing display includes replacing vehicle operational data in the portion of the instrument cluster electronic display with the one or more images.

In a further embodiment of any of the foregoing embodiments, the trigger event includes activation of a turn signal.

In a further embodiment of any of the foregoing embodiments, the method includes detecting, based on the images or based on data from an object detection sensor, an external object that is separate from the vehicle, and the trigger event includes the detected external object meeting one or more criteria.

In a further embodiment of any of the foregoing embodiments, the at least one a camera includes a first camera and a second camera, the method includes stitching together an image from the first camera and an image from the second camera to form a combined image, and the commencing display includes commencing display of the combined image.

In a further embodiment of any of the foregoing embodiments, the first camera has a first field of view that includes an external environment adjacent to a first side and first front corner of a tractor of a commercial vehicle; and the second camera is aft of the first camera and has a field of view that extends rearwards along the first side of the commercial vehicle, behind the first field of view.

A method for a camera monitor system (CMS) according to an example embodiment of the present disclosure includes utilizing one or more first cameras to obtain images of an external environment along a first side of a commercial vehicle; utilizing one or more second cameras to obtain images of an external environment along a second side of a commercial vehicle, which is opposite the first side; and, based on detection of a trigger event, commencing display of one or more images from the one or more first cameras or the one or more second cameras on a portion of an instrument cluster electronic display.

In a further embodiment of the foregoing embodiment, the instrument cluster includes a first display area associated with the first side of the commercial vehicle, a second display area associated with the second side of the commercial vehicle, and a middle display area disposed between the first display area and the second display area. The method includes replacing vehicle operational data in the first display area with one or more first images from the one or more first cameras based on occurrence of a first trigger event corresponding to the first side of the commercial vehicle; and replacing vehicle operational data in the second display area with one or more second images from the one or more second cameras based on occurrence of a second trigger event corresponding to the second side of the commercial vehicle.

In a further embodiment of any of the foregoing embodiments, the one or more first cameras include a first pair of cameras with respective fields of view corresponding to the first side of the commercial vehicle, and the one or more first images include a combined image that is stitched together from respective images of the cameras of the first pair; and the one or more second cameras include a second pair of cameras with respective fields of view corresponding to the second side of the commercial vehicle, and the one or more second images include a combined image that is stitched together from respective images of the cameras of the second pair.

In a further embodiment of any of the foregoing embodiments, the one or more first cameras include a first corner camera having a field of view that includes an external environment adjacent to a first side and a first front corner of a tractor of a commercial vehicle; and a first side camera disposed aft of the first corner camera, and having a field of view that extends rearwards along the first side of the commercial vehicle, behind the first field of view. The one or more second cameras includes a second corner camera having a field of view that includes an external environment adjacent to the second side and a second front corner of the tractor; and a second side camera disposed aft of the second corner camera, and having a field of view that extends rearwards along the second side of the commercial vehicle, behind the second field of view.

In a further embodiment of any of the foregoing embodiments, the first trigger event includes activation of a first turn signal indicating a driver intention to turn towards the first side of the commercial vehicle, and the second trigger event includes activation of a second turn signal indicating a driver intention to turn towards the second side of the commercial vehicle.

In a further embodiment of any of the foregoing embodiments, the first trigger event includes detection of an object along the first side of the commercial vehicle that meets one or more first criteria, and the second trigger event includes detection of an object along the second side of the commercial vehicle that meets one or more second criteria.

A camera monitor system (CMS) according to an example embodiment of the present disclosure includes at least one first camera, each of the at least one first cameras having a field of view that extends along a first side of a commercial vehicle; at least one second camera, each of the at least one second cameras having a field of view that extends along a second side of a commercial vehicle that is opposite the first side; and processing circuitry operatively connected to memory and configured to, based on detection of a trigger event, commence display of one or more images from the one or more first cameras or the one or more second cameras on a portion of an instrument cluster electronic display.

In a further embodiment of the foregoing embodiment, to commence display of the one or more images, the processing circuitry is configured to replace vehicle operational data in the portion of the instrument cluster electronic display with the one or more images.

In a further embodiment of any of the foregoing embodiments, the trigger event includes activation of a turn signal of the commercial vehicle.

In a further embodiment of any of the foregoing embodiments, the trigger event includes detection of an external object that meets one or more criteria.

In a further embodiment of any of the foregoing embodiments, the CMS includes an object detection sensor, which includes a LIDAR sensor, a RADAR sensor, or an ultrasonic sensor, and the processing circuitry is configured to utilize the object detection sensor to detect the external object, and is configured to determine if the external object meets the one or more criteria.

In a further embodiment of any of the foregoing embodiments, the processing circuitry is configured to utilize a neural network to analyze the one or more images for presence of the external object.

In a further embodiment of any of the foregoing embodiments, the at least one first camera includes a first pair of cameras with fields of view corresponding to the first side of the commercial vehicle. The at least one second camera includes a second pair of cameras with fields of view corresponding to the second side of the commercial vehicle. The processing circuitry is configured to stitch together respective images from the first pair of cameras to form a first combined image, and commence display of the first combined image; and stitch together respective images from the second pair of cameras to form a second combined image, and commence display of the second combined image.

In a further embodiment of any of the foregoing embodiments, the instrument cluster includes a first display area associated with the first side of the commercial vehicle, a second display area associated with the second side of the commercial vehicle, and a middle display area disposed between the first display area and the second display area. The processing circuitry is configured to replace vehicle operational data in the first display area with one or more first images from the one or more first cameras based on occurrence of a first trigger event corresponding to the first side of the commercial vehicle; and replace vehicle operational data in the first display area with one or more second images from the one or more second cameras based on occurrence of a second trigger event corresponding to the second side of the commercial vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

DETAILED DESCRIPTION

Figure 1:
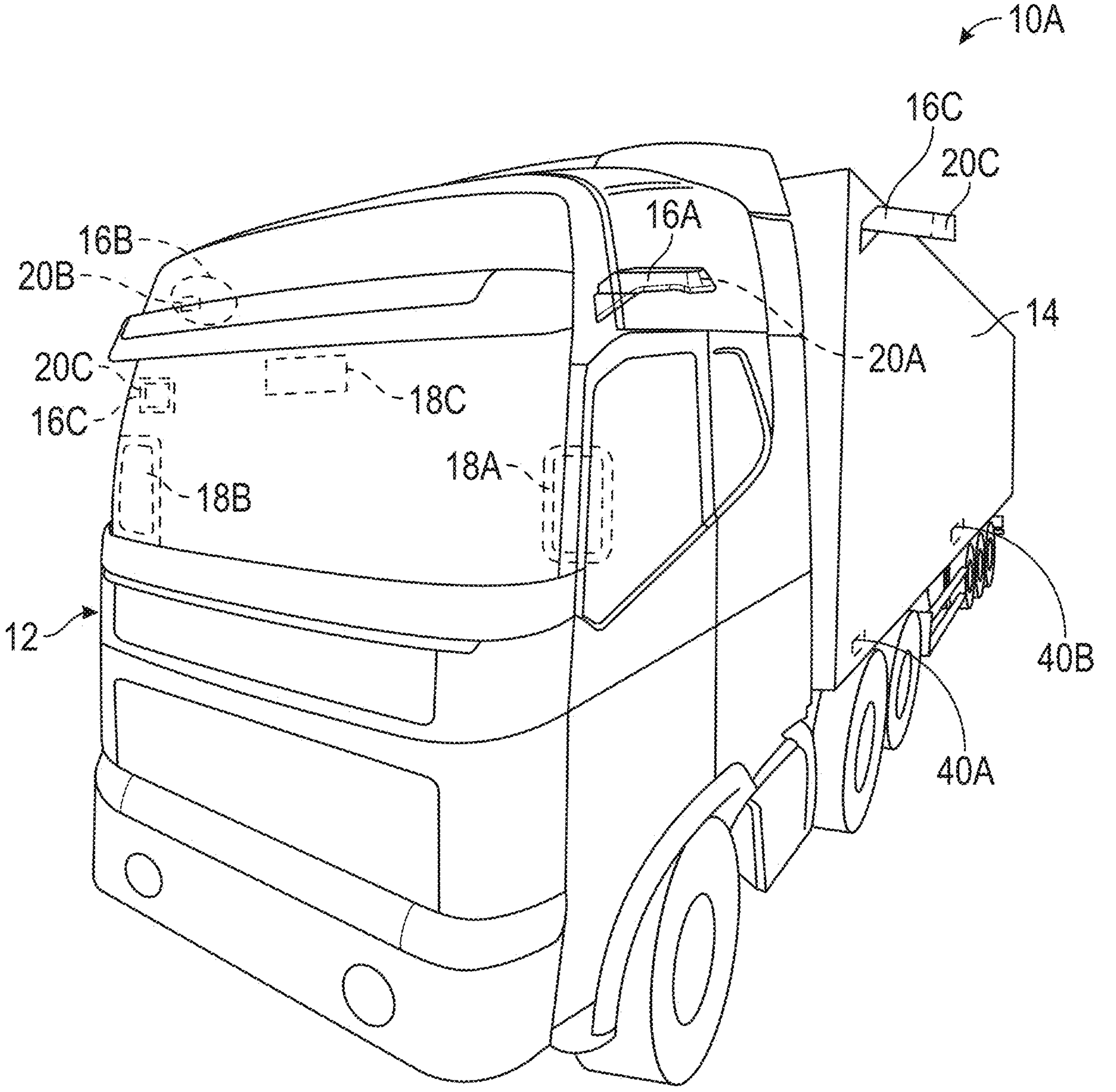
FIG. 1 is a schematic perspective front view of a commercial vehicle with a camera monitor system (CMS).

Schematic views of an example commercial vehicle 10 are provided in FIGS. 1-6. FIG. 1, which provides a perspective view of the commercial vehicle 10, and FIGS. 2-4, which each provide birds-eye views of the commercial vehicle 10, will be discussed first. As shown in FIGS. 1-4, the commercial vehicle 10 includes a vehicle cab or "tractor" 12 for pulling a trailer 14, where the trailer 14 pivots with respect to the tractor 12 during turns. Although the commercial vehicle 10 is depicted as a commercial truck with a single trailer 14 in this disclosure, it is understood that other commercial vehicle configurations may be used (e.g., different types or quantities of trailers).

A first pair of camera arms 16A-B are mounted to the tractor 12, and a second pair of camera arms 16C-D are mounted to the trailer 14. One, all, or a subset of the camera arms 16A-D may articulate relative to their base between a retracted position and an extended position (shown, e.g., in FIG. 2). Each camera arm 16A-D includes at least one respective rearward facing camera 20A-D on or within the arm 16. The cameras 20A-B respectively provide an exterior fields of view $FOV_{EX1}$, $FOV_{EX2}$ that each include at least one of Class II and Class IV views (see FIG. 2), which are legally prescribed views in the commercial trucking industry. The exterior cameras 20C-D respectively provide exterior fields of view $FOV_{EX3}$, $FOV_{EX4}$ that have some overlap with the Class II and Class IV views. The field of view $FOV_{EX3}$ extends rearward along the trailer 14 of the commercial vehicle 10 along the first side 21A. The field of view $FOV_{EX4}$ extends rearward along the trailer 14 of the commercial vehicle 10 along the second side 21B.

Although an example location for camera arms 16C, 16D is shown, it is understood that this is a non-limiting example, and that the cameras 16C-D may be mounted in other locations, even without an arm. For example, the cameras 16C-D may be mounted proximate to the lower front corners of the trailer 14 (see, e.g., location 40A in FIG. 1) or approximately halfway between a front end 22A and rear end 22B of the trailer 14 (see, e.g., location 40B in FIG. 1). As shown, the cameras 20C-D are aft of the cameras 20A-B.

Figure 2:
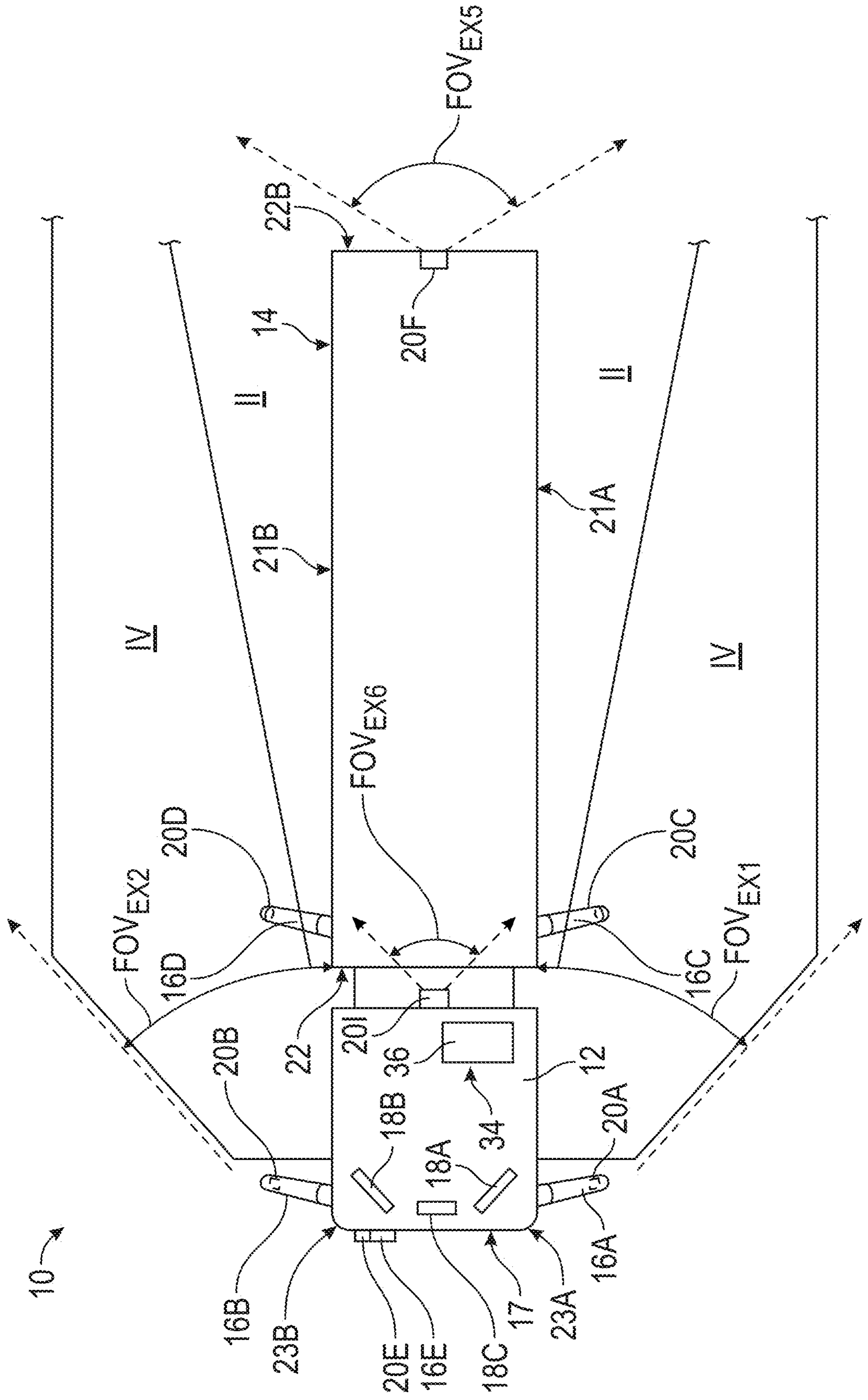
FIG. 2 is a schematic birds-eye view of the commercial vehicle of FIG. 1.
Figure 3:
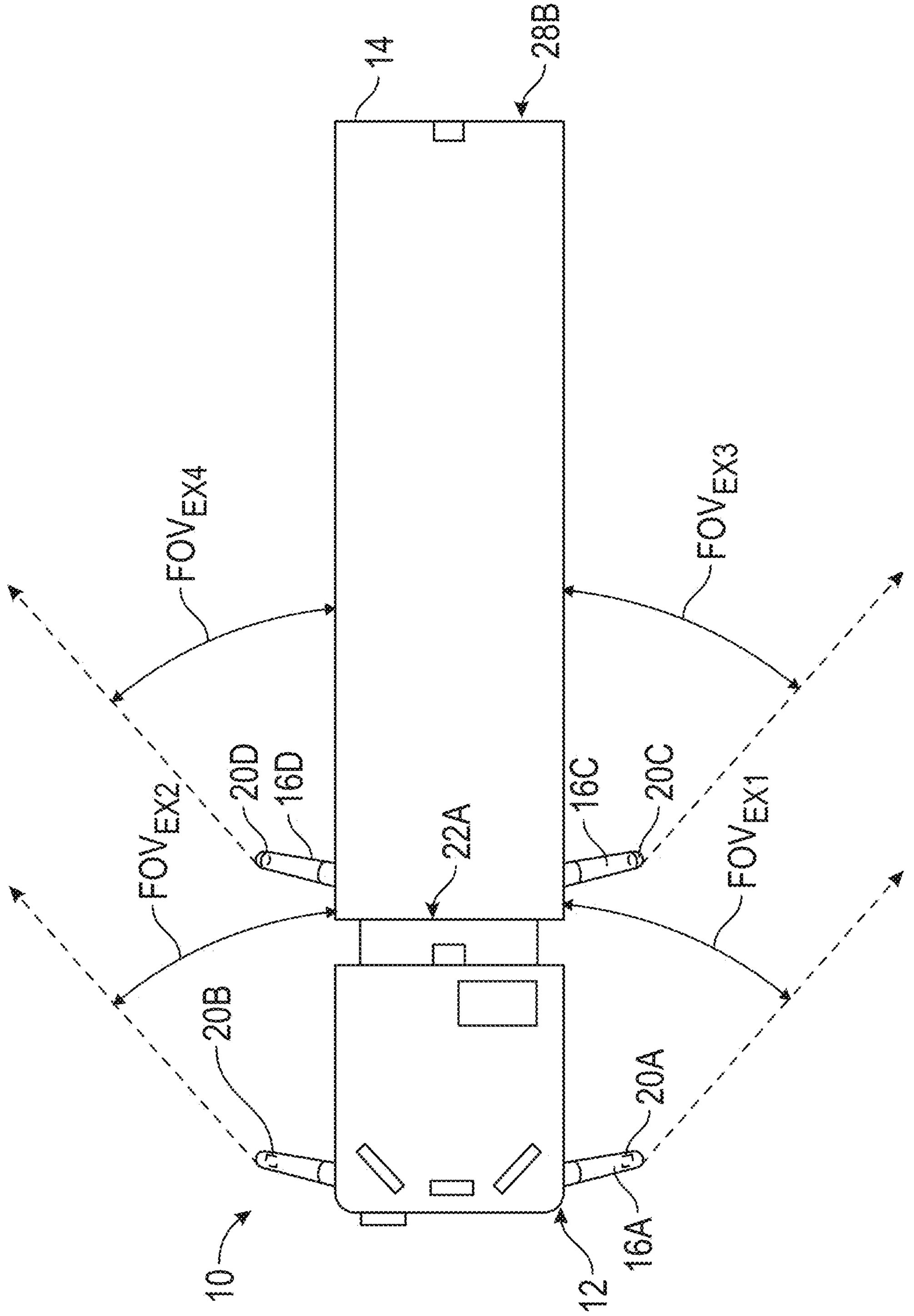
FIG. 3 is another schematic birds-eye view of the commercial vehicle of FIG. 1.

As shown in FIG. 2, the commercial vehicle 10 has a first side 21A (driver's side) and a second side 21B (passenger side) that is opposite the first side 11. The commercial vehicle 10 also has a front end 17 and a rear end that corresponds to the rear end 22B of the trailer, and that is opposite the front end 17 of the commercial vehicle 10. The tractor 12 also has a first front corner 23A and a second front corner 23B that is opposite the first front corner 23A.

The Class II view on a given side of the commercial vehicle 10 is a subset of the class IV view of the same side of the commercial vehicle 10. Multiple cameras also may be used in each camera arm 16A-B to provide these views, if desired. Class II (narrow) and Class IV (wide angle) views are defined in European R46 legislation, for example, and the United States and other countries have similar drive visibility requirements for commercial trucks. Any reference to a "Class" view is not intended to be limiting, but rather is intended as an example of the type of view provided to a display from a particular camera.

Figure 5:
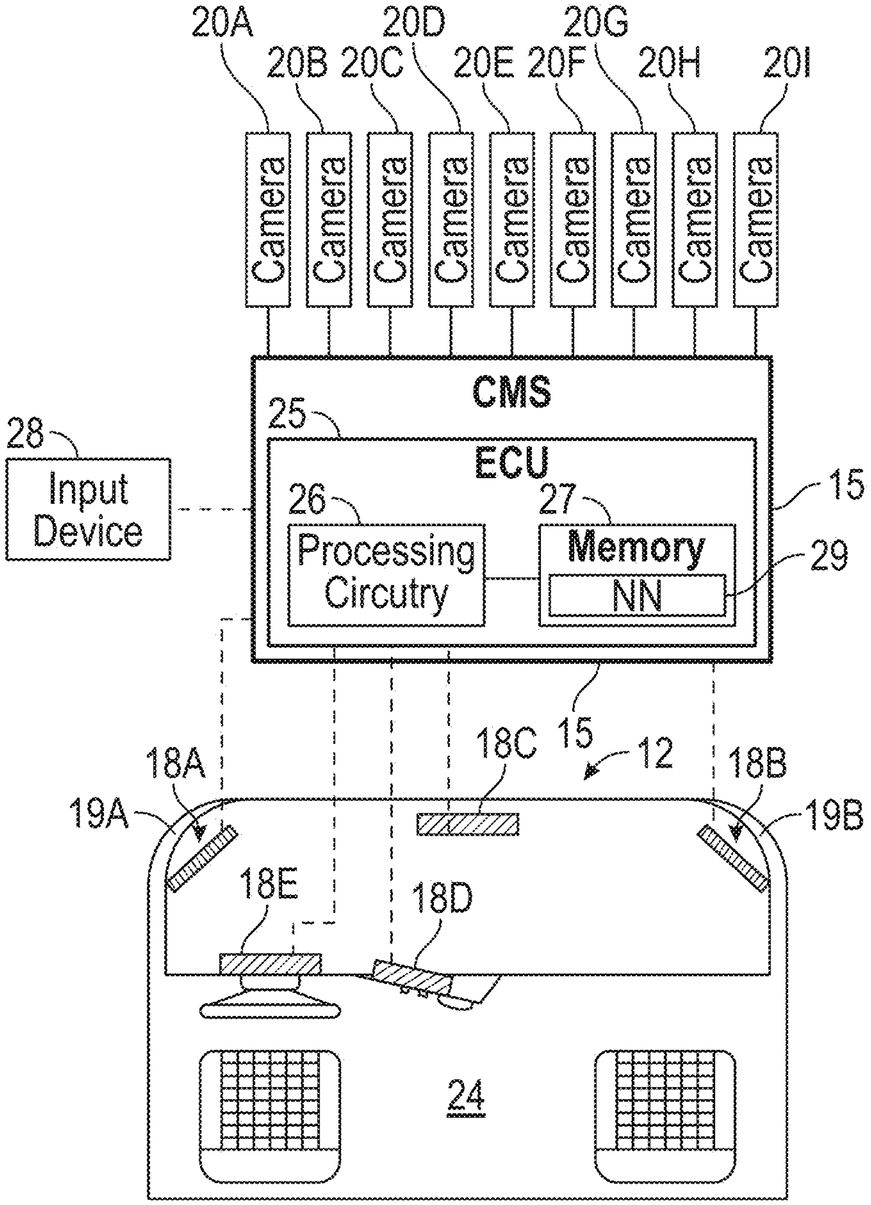
FIG. 5 is a schematic top view of an example vehicle cabin interior of the commercial vehicle of FIG. 1.

Each camera arm 16A-16D may also provide a housing that encloses electronics, e.g., a controller, that are configured to provide various features of a camera monitor system (CMS) 15 (see FIG. 5). The camera arms 16A-B may be mounted either at a roof-mount location over the cab door (as shown), or on a door-mounted bracket or station, for example. Similarly, the camera arms 16C-D may be mounted at a roof-mount location of the trailer 14, for example.

A backup camera 20F provides a field of view $FOV_{EX5}$ of rear area 28C behind the commercial vehicle 10, which overlaps the fields of view $FOV_{EX1}$, $FOV_{EX2}$, $FOV_{EX3}$, $FOV_{EX4}$. Thus, the field of view $FOV_{EX5}$ includes an external environment of the rear of the commercial vehicle 10. The backup camera 20F may be mounted at a top/centerline of the trailer, at a bumper/bed level of the trailer, or at a top-corner of the back of the trailer, for example.

Alternatively, or in addition to the rear trailer camera, a "fifth wheel camera" 201 may be provided that is mounted to a rear of the tractor 12 and that provides a field of view $FOV_{EX6}$ Which, when the trailer 14 is disconnected from the cab 12, also overlaps the fields of view $FOV_{EX1}$, $FOV_{EX2}$, $FOV_{EX3}$, $FOV_{EX4}$. The fifth wheel camera 20I may be mounted anywhere between the lateral plane of the fifth wheel fixture and the top/roof edge of the tractor, for example. The cameras 20A-G are part of a camera monitor system (CMS) 15 (see FIG. 4).

Figure 4:
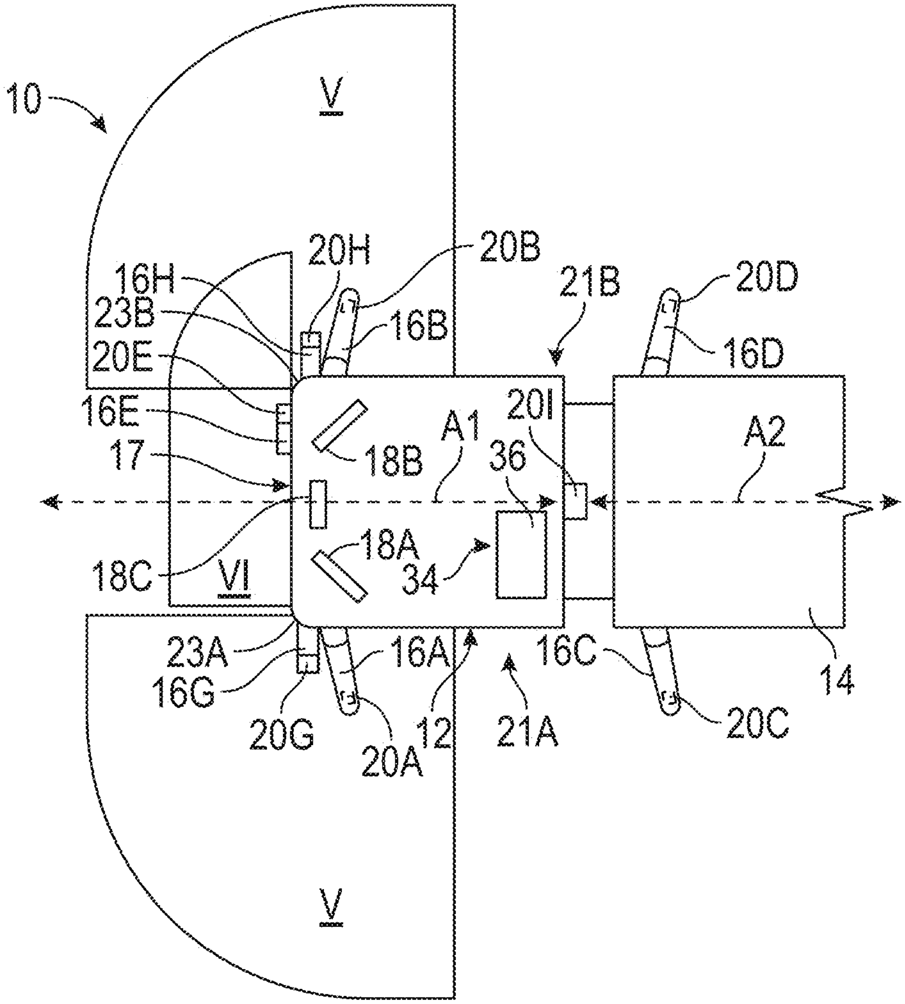
FIG. 4 is another schematic birds-eye view of the commercial vehicle of FIG. 1.

Referring to FIGS. 2 and 4, a camera housing 16E and camera 20E may be arranged at or near the front of the commercial vehicle 10 to provide a Class VI view. The camera 20E has a field of view corresponding to an external environment of the front end 17 of the commercial vehicle 10.

Cameras 20G and 20H (having respective housings 16G and 16H) may be utilized to provide respective Class V views, for each side 21A, 21B of the commercial vehicle. Camera 20G provides a field of view that corresponds to an external environment adjacent to the first side 21A and first front corner 23A of the commercial vehicle 10. Camera 20H provides a field of view that corresponds to an external environment adjacent to the second side 21B and second front corner 23B of the commercial vehicle 10. Although cameras 20G-H are not shown in FIGS. 1-3 for simplicity, it is understood that they may be included on the commercial vehicle 10.

Figure 6:
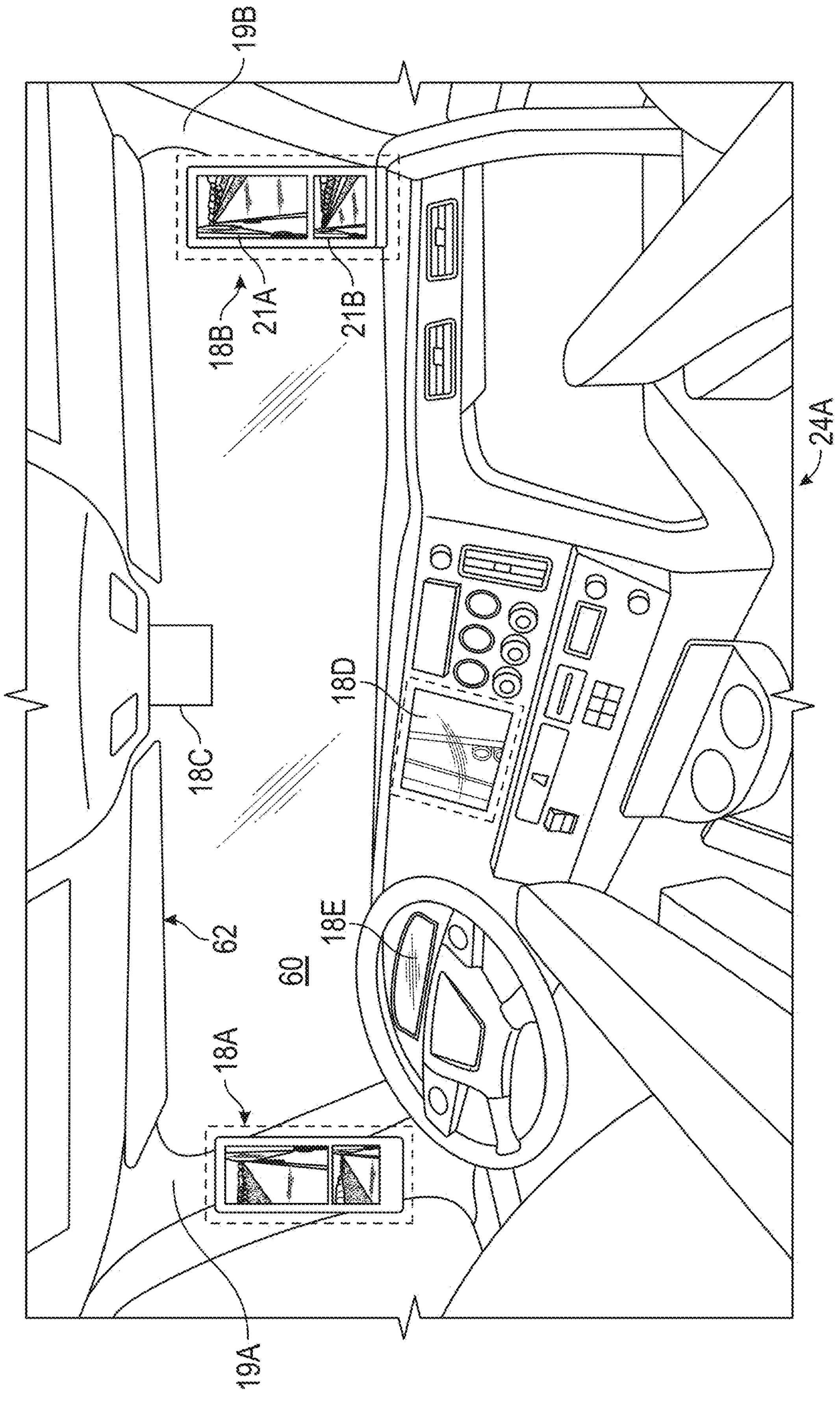
FIG. 6 is a perspective view of the vehicle cabin interior of FIG. 5.

FIG. 5 is a schematic top view of an example vehicle cabin interior 24, and FIG. 6 is a perspective view of the vehicle cabin interior 24. Referring now to FIGS. 5-6 with continued reference to FIGS. 1-4, electronic displays 18A-E (e.g., which may be video displays, such as LCD displays) and cameras 20A-I are shown. The various electronic displays 18A-E and cameras 20A-I are part of the CMS 15, and therefore act as CMS displays 18 and CMS cameras 20.

The CMS 15 includes an electronic control unit (ECU) 25 that acts as a controller and includes processing circuitry 26 that supports operation of the CMS 15. The processing circuitry 26 is operatively connected to memory 27 (which may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The processing circuitry 26 may include one or more microprocessors, microcontrollers, application specific integrated circuits (ASICs), or the like. In one or more embodiments, the memory 27 includes one or more neural networks 29 trained to detect objects based on images from the cameras 20 (e.g., animals, vehicles, road obstacles, vulnerable road users such as pedestrians and cyclists, etc.).

The CMS displays 18A-B are arranged on each of the driver and passenger sides within the vehicle cab 12 on or near the A-pillars 19A-B to display Class II and Class IV views on its respective side of the commercial vehicle 10, which provide rearward facing side views along the commercial vehicle 10 that are captured by the exterior cameras 20A-B.

If desired, one or more of the camera arms 16A-B may include conventional mirrors integrated with them as well, although the CMS 15 may be used to entirely replace mirrors. In additional examples, each side can include multiple camera arms, with each arm housing one or more cameras and/or mirrors.

In the example of FIG. 6, the display 18C is disposed along an upper edge 62 of a windshield 60 of the commercial vehicle 10, and is substantially evenly spaced between the first side 21A and second side 21B of the commercial vehicle (and correspondingly is also substantially evenly spaced between the A-pillars 19A-B).

Display 18A is configured to provide an image feed from camera 20A, and display 18B is configured to provide an image feed from camera 20B. Display 18C may be used to display the Class V and Class VI views (see FIG. 4), which are toward the front end 17 of the commercial vehicle 10, or a backup camera view (from backup camera 20F or camera 20I) to the driver. Display 18D is provided in a center console area of the vehicle cabin interior 24, and may be used as a backup display or for other purposes, such as navigation, infotainment, etc. Display 18E is an instrument cluster electronic display that is part of an instrument cluster.

Figure 7:
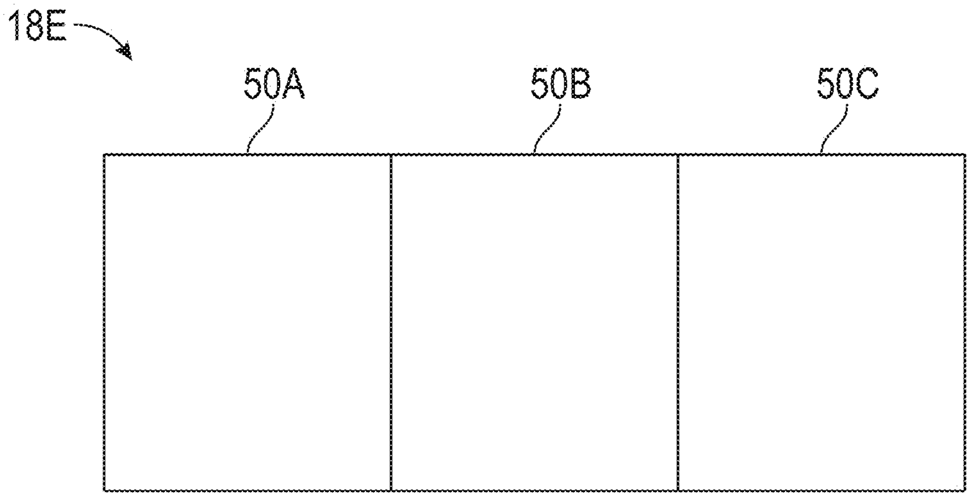
FIG. 7 schematically illustrates an example instrument cluster electronic display.

FIG. 7 schematically illustrates an example layout for the instrument cluster electronic display 18. As shown, the layout includes a left display area 50A, a middle display area 50B, and a right display area 50C. The middle display area 50B is disposed between the left display area 50A and the right display area 50C. Conventionally, each of these display areas would be used to display vehicle operational data. For example, left display area 50A is commonly used to depict an analog RPM meter, right display area 50C is commonly used to depict an analog speedometer, and middle display area 50B is commonly used to depict the vehicle speed as a number (e.g., "50 mph") and/or to indicate a gear in which the vehicle is currently operating (e.g., "D" for drive, "R" for reverse, etc.). In one or more embodiments, the display area 50A is associated with side 21A of the commercial vehicle 10, and the display area 50B is associated with side 21B of the commercial vehicle 10.

As will be described in further detail below, the ECU 25 is configured to selectively display CMS images on one or more of the areas 50A-C of the instrument cluster electronic display 18E in response to detection of a trigger event.

Figure 8:
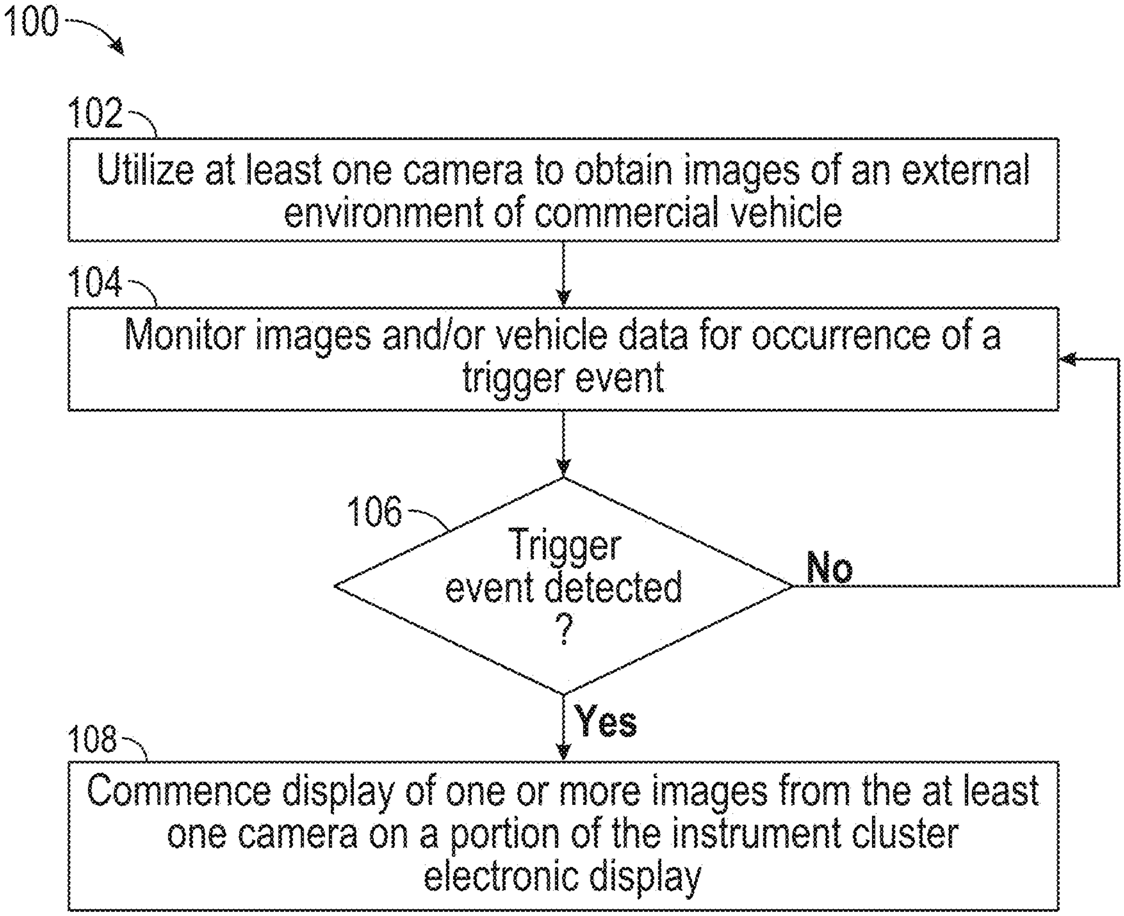
FIG. 8 schematically illustrates an example method for a CMS.

FIG. 8 schematically illustrates an example method 100 for a CMS. The method 100 may be performed in whole or in part by the ECU 25, for example. The ECU 25 utilizes at least one of the cameras 20 to obtain images of an external environment of the commercial vehicle 10 (step 102), and the ECU 25 monitors the images and/or vehicle data for occurrence of a trigger event (step 104).

There may be one type or a plurality of different types of trigger events recognized by the ECU 25. In one or more embodiments, one type of trigger event includes activation of a turn signal of the commercial vehicle 10, which indicates that a driver is planning to turn or change lanes. This may be monitored by monitoring a vehicle CAN bus, for example. In one or more embodiments, one type of trigger event includes detection of an external object that is separate from the commercial vehicle 10 and meets one or more criteria (e.g., the detected object is sufficiently close to the commercial vehicle to pose a collision risk and/or the detected object is approaching the vehicle and is within a predefined distance of the commercial vehicle 10, etc.). The object may be detected by utilizing the one or more neural networks 29 to analyze the images from one or more of the cameras 20, and/or by using an object detection sensor (e.g., LIDAR, RADAR, or ultrasonic). The one or more criteria may be the same for all cameras, or different criteria may be used for different cameras (e.g., different distance thresholds).

If the trigger event is not detected (a "no" to step 106), the method proceeds back to step 104. Otherwise, if the trigger event is detected (a "yes" to step 106), then based on the detection of the trigger event, the ECU 25 commences display of one or more images from the one or more cameras 20 on a portion of the instrument cluster electronic display 18E (step 108).

In one or more embodiments, step 108 includes replacing vehicle operational data in the portion of the instrument cluster electronic display 18E with the one or more images.

Assume, for the example below, that the trigger event corresponds to the driver activating a left turn signal, which indicates that the driver is planning to turn left and/or change lanes to the left towards side 21A of the commercial vehicle 10. In one such example, step 108 includes displaying an image and/or image feed from camera 20A, 20C and/or 20G, which each have fields of view along side 21A of the commercial vehicle. In one or more embodiments, the image displayed is stitched image that combines images from multiple ones of the cameras 20, such as an image from a camera having a field of view that includes an external environment adjacent to a first side and first corner of the tractor 12 (e.g., camera 20G) and a second camera that is aft of the first camera and has a field of view that extends rearwards along the first side of the commercial vehicle, behind the first field of view (e.g., camera 20A or 20C). In one or more embodiments, the image displayed is from a single one of the CMS cameras (e.g., camera 20A, 20C, or 20G). The image stitching may be performed using known techniques.

Now assume that the trigger event corresponds to the driver activating a right turn signal, which indicates that the driver is intends to turn right and/or change lanes to the right towards side 21B of the commercial vehicle 10. In this example, an image (stitched or non-stitched) from cameras 20A, 20C, and/or 20G could be displayed in display area 50C, which corresponds to side 21B of the commercial vehicle 10.

The systems and methods discussed herein provide for a beneficial way to notify a driver of items of interest which may pose collision risks in a non-distracting manner, and by using the instrument cluster electronic display 18E, interruption of the typical Class II/Class IV display arrangement of the displays 18A-B may be avoided.

Although example embodiments have been disclosed, a worker of ordinary skill in this art would recognize that certain modifications would come within the scope of the claims. For that reason, the following claims should be studied to determine their true scope and content.

What is claimed is:

1. A method for a camera monitor system (CMS), comprising:

utilizing at least one camera to obtain images of an external environment of a commercial vehicle; and based on detection of a trigger event, commencing display of one or more images from the at least one camera on a portion of an instrument cluster electronic display, wherein the instrument cluster electronic display is part of an instrument cluster that is disposed behind a steering wheel of the commercial vehicle;

wherein the at least one a camera includes a first camera having a first field of view that includes an external environment adjacent to a first side and first front corner of a tractor of a commercial vehicle;

wherein the at least one camera includes a second camera that is aft of the first camera and has a field of view that extends rearwards along the first side of the commercial vehicle, behind the first field of view;

wherein the method includes stitching together an image from the first camera and an image from the second camera to form a combined image; and wherein said commencing display comprises commencing display of the combined image.

2. The method of claim 1, wherein said commencing display comprises replacing vehicle operational data in the portion of the instrument cluster electronic display with the combined image.

3. The method of claim 1, wherein the trigger event comprises activation of a turn signal.

4. The method of claim 1, comprising:

detecting, based on the images or based on data from an object detection sensor, an external object that is separate from the vehicle;

wherein the trigger event comprises the detected external object meeting one or more criteria.

5. A method for a camera monitor system (CMS), comprising:

utilizing one or more first cameras to obtain images of an external environment along a first side of a commercial vehicle;

utilizing one or more second cameras to obtain images of an external environment along a second side of a commercial vehicle, which is opposite the first side; and based on detection of a trigger event, commencing display of one or more images from the one or more first cameras or the one or more second cameras on a portion of an instrument cluster electronic display;

wherein the instrument cluster electronic display is part of an instrument cluster that is disposed behind a steering wheel of the commercial vehicle;

wherein the instrument cluster electronic display includes a first display area associated with the first side of the commercial vehicle, a second display area associated with the second side of the commercial vehicle, and a middle display area disposed between the first display area and the second display area; and wherein the method includes:

replacing vehicle operational data in the first display area with one or more first images from the one or more first cameras based on occurrence of a first trigger event corresponding to the first side of the commercial vehicle; and replacing vehicle operational data in the second display area with one or more second images from the one or more second cameras based on occurrence of a second trigger event corresponding to the second side of the commercial vehicle.

6. The method of claim 5, wherein:

the one or more first cameras includes a first pair of cameras with respective fields of view corresponding to the first side of the commercial vehicle, and the one or more first images include a combined image that is stitched together from respective images of the cameras of the first pair; and the one or more second cameras include a second pair of cameras with respective fields of view corresponding to the second side of the commercial vehicle, and the one or more second images include a combined image that is stitched together from respective images of the cameras of the second pair.

7. The method of claim 6, wherein:

the one or more first cameras include:

a first corner camera having a first field of view that includes an external environment adjacent to a first side and a first front corner of a tractor of a commercial vehicle; and a first side camera disposed aft of the first corner camera, and having a field of view that extends rearwards along the first side of the commercial vehicle, behind the first field of view; and the one or more second cameras includes:

a second corner camera having a second field of view that includes an external environment adjacent to the second side and a second front corner of the tractor; and a second side camera disposed aft of the second corner camera, and having a field of view that extends rearwards along the second side of the commercial vehicle, behind the second field of view.

8. The method of claim 6, wherein:

the first trigger event comprises activation of a first turn signal indicating a driver intention to turn towards the first side of the commercial vehicle; and the second trigger event comprises activation of a second turn signal indicating a driver intention to turn towards the second side of the commercial vehicle.

9. The method of claim 5, wherein:

the first trigger event comprises detection of an object along the first side of the commercial vehicle that meets one or more first criteria; and the second trigger event comprises detection of an object along the second side of the commercial vehicle that meets one or more second criteria.

10. A camera monitor system (CMS), comprising:

at least one first camera, each of the at least one first cameras having a field of view that extends along a first side of a commercial vehicle;

at least one second camera, each of the at least one second cameras having a field of view that extends along a second side of a commercial vehicle that is opposite the first side; and processing circuitry operatively connected to memory and configured to, based on detection of a trigger event, commence display of one or more images from the at least one first camera or the at least one second camera on a portion of an instrument cluster electronic display, wherein the instrument cluster electronic display is part of an instrument cluster that is disposed behind a steering wheel of the commercial vehicle;

wherein the instrument cluster electronic display includes a first display area associated with the first side of the commercial vehicle, a second display area associated with the second side of the commercial vehicle, and a middle display area disposed between the first display area and the second display area; and wherein the processing circuitry is configured to:

replace vehicle operational data in the first display area with one or more first images from the at least one first camera based on occurrence of a first trigger event corresponding to the first side of the commercial vehicle; and replace vehicle operational data in the first display area with one or more second images from the at least one second camera based on occurrence of a second trigger event corresponding to the second side of the commercial vehicle.

11. The CMS of claim 10, wherein to commence display of the one or more images, the processing circuitry is configured to replace vehicle operational data in the portion of the instrument cluster electronic display with the one or more images.

12. The CMS of claim 10, wherein the trigger event comprises activation of a turn signal of the commercial vehicle.

13. The CMS of claim 10, wherein the trigger event comprises detection of an external object that meets one or more criteria.

14. The CMS of claim 13, comprising:

an object detection sensor, which includes a LIDAR sensor, a RADAR sensor, or an ultrasonic sensor;

wherein the processing circuitry is configured to:

utilize the object detection sensor to detect the external object; and determine if the external object meets the one or more criteria.

15. The CMS of claim 13, wherein the processing circuitry is configured to:

utilize a neural network to analyze the one or more images for presence of the external object.

16. The CMS of claim 10, wherein:

the at least one first camera includes a first pair of cameras with fields of view corresponding to the first side of the commercial vehicle;

the at least one second camera includes a second pair of cameras with fields of view corresponding to the second side of the commercial vehicle; and the processing circuitry is configured to:

stitch together respective images from the first pair of cameras to form a first combined image, and commence display of the first combined image; and stitch together respective images from the second pair of cameras to form a second combined image, and commence display of the second combined image.

* * * * *